United States Patent Office 3,495,247
Patented Feb. 10, 1970

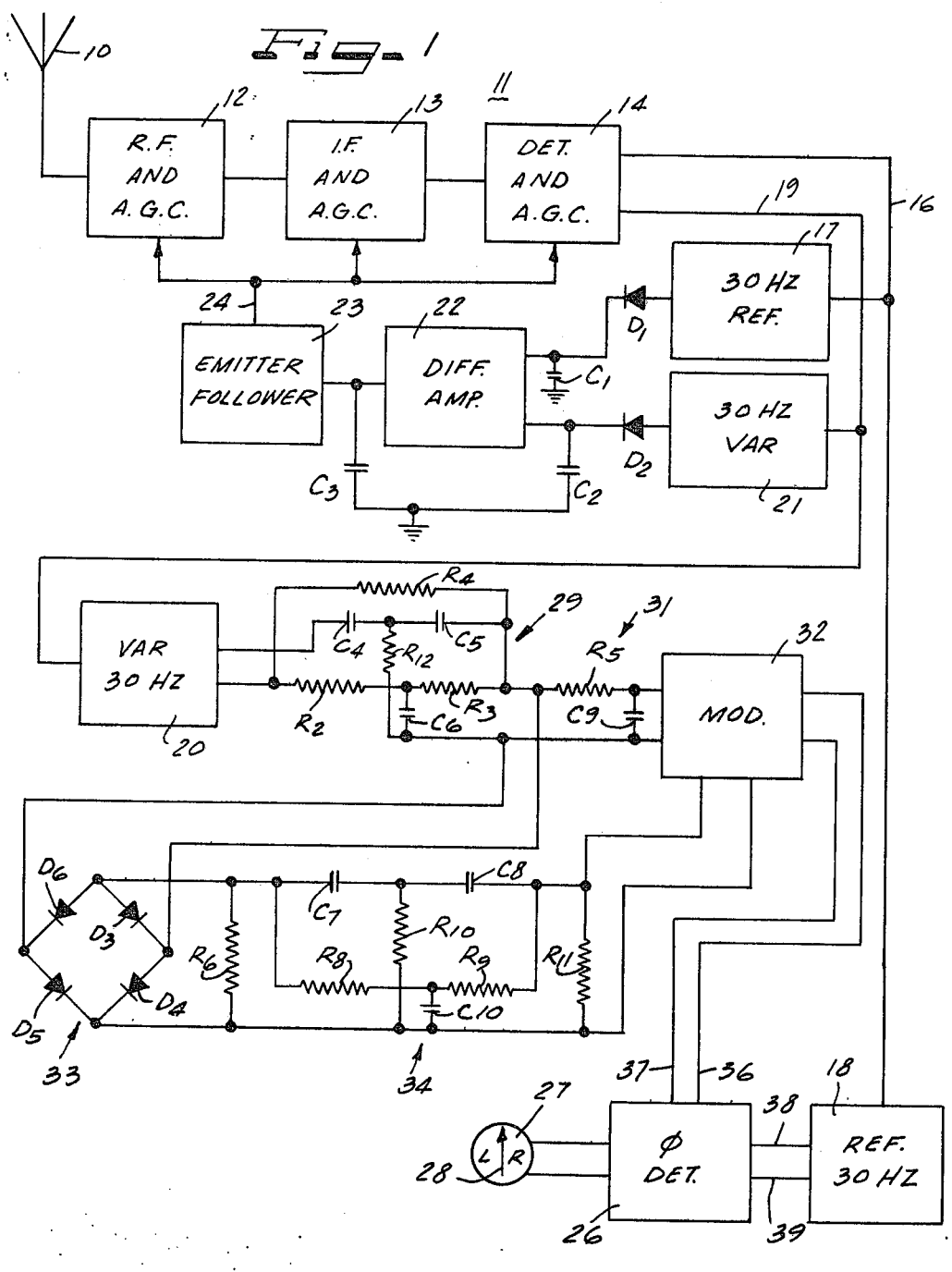

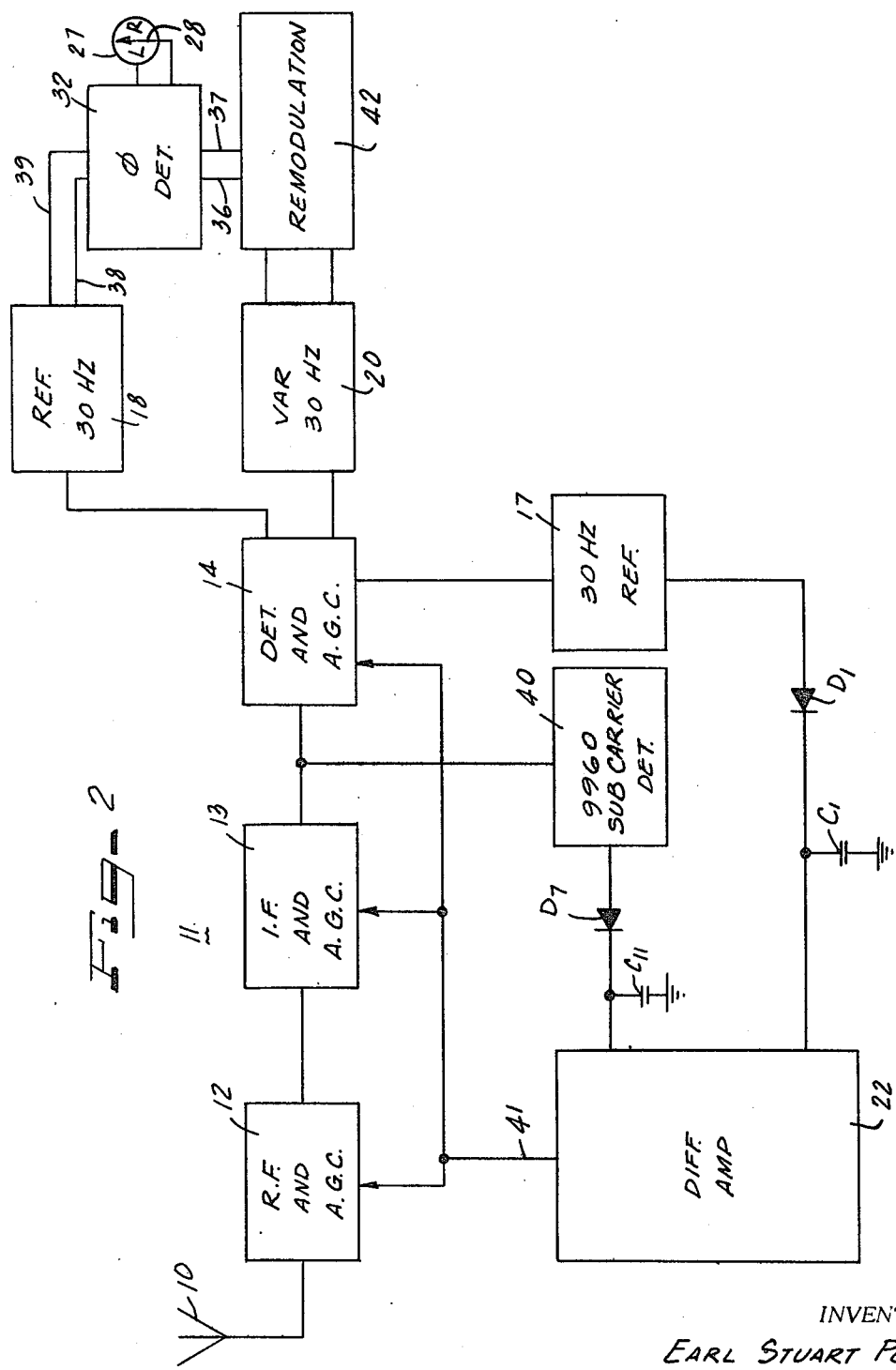

3,495,247
APPARATUS AND METHOD FOR CONTROLLING THE AMPLITUDE OF THE 30-HERTZ VARIABLE SIGNAL IN A VOR SYSTEM
Earl Stuart Perkins, Oak Brook, Ill., assignor to Butler National Corporation, Minneapolis, Minn., a corporation of Delaware
Filed July 3, 1968, Ser. No. 742,324
Int. Cl. G01s *1/50;* H04b *1/16*
U.S. Cl. 343—106                                                14 Claims

ABSTRACT OF THE DISCLOSURE

An improved navigation receiver for detecting VOR signals and which utilizes the 30-hertz reference amplitude signal as an amplitude reference to control the automatic gain in the R.F., I.F., and detector circuitry. The 30-hertz reference signal is compared with the 30-hertz variable signal and an automatic gain control signal is developed which is proportional to the difference in these two signals to control the automatic gain control circuits in the R.F., I.F., and detector.

CROSS REFERENCE TO RELATED APPLICATION

My copending application entitled "Remodulation" filed Apr. 3, 1968, Ser. No. 718,412, comprises an improved VOR system which may be used with the additional improvement disclosed in the present application.

BACKGROUND OF THE INVENTION

Field of the invention

This invention relates in general to aircraft navigation systems and in particular to VOR receivers used in controlling aircraft.

Description of the prior art

Aircraft navigation systems utilize VOR receivers in which a fixed reference 30-hertz signal and a variable 30-hertz signal are transmitted and received to produce a line of bearing from the VOR transmitter. The phase between the reference signal and the variable phase signal indicate the bearing from station at the observers position.

SUMMARY OF THE INVENTION

An improved VOR receiver in which the amplitude modulated variable frequency signal is isolated from the reference signal immediately following detection. The AM variable frequency signal is compared in amplitude with the reference signal and the difference is utilized as an automatic gain control in the R.F. and I.F. stages. Signals may also be used in the detector stage. Since the 30-hertz reference signal remains nearly constant in amplitude as it rides the amplitude change in quadrature, it may be considered as an amplitude reference as well as a phase reference. By applying the amplitude difference between the 30-hertz reference signal and the 30-hertz variable signal to a difference amplifier, an automatic gain control signal may be obtained to control the R.F. and I.F. sections of the receiver and to eliminate phase errors in the output of the receiver caused by amplitude distortions which lead to non-linearity.

Other objects, features and advantages of the present invention will be readily apparent from the following detailed description of certain preferred embodiments thereof taken in conjunction with the accompanying drawings.

BRIEF DESCRIPTION OF THE DRAWINGS

FIGURE 1 is a block diagram of the improved VOR receiver of this invention; and

FIGURE 2 is a block diagram of a modification of this invention.

DESCRIPTION OF THE PREFERRED EMBODIMENTS

As the air spaces become more and more crowded with aircraft and the individual aircraft travel with increased speed, it becomes increasingly important to maintain accurate spacings between the aircraft and for each craft to know its precise position. VOR navigation receivers operate in the 108 to 118 megahertz frequency range and provide aircraft with lines of bearing or azimuth to a station on the ground. This is accomplished in a VOR receiver in the aircraft by comparing the phase between two 30-hertz modulating signals. One is a reference signal whose phase remains constant around the ground station; the other signal's phase varies with azimuth around the ground station.

The 30-hertz reference signal frequency modulates a sub carrier of 9960 hertz which, in turn, amplitude modulates the radio frequency carrier. The combined signal is transmitted by an omnidirectional antenna so that the phase of the reference around the ground station is the same at all locations.

The 30-hertz variable phase signal is provided by the equivalent of a cardioid-shaped antenna pattern rotating around the ground station at thirty revolutions per second. This signal is received and processed by the VOR receiver and appears as a 30-hertz sinewave whose phase with respect to the reference sinewave varies with bearing.

Received and detected by the receiver, the two signals are in phase when the receiving antenna on the aircraft is due north of the transmitting station. The phase of the variable signal lags the reference signal by the number of degrees the aircraft moves clockwise around the station. This difference is displayed as the bearing to or from the VOR station. It has been discovered that by comparing the amplitude of the variable frequency 30-hertz signal with the amplitude of the 30-hertz reference signal and detecting the difference to produce automatic gain control signals in the radio frequency and I.F. sections of the receiver, that much more accurate output from the VOR receiver may be obtained.

It is to be noted that the 30-hertz reference signal's amplitude remains nearly constant because it rides the amplitude changes in quadrature and it can thus be considered an amplitude reference as well as a phase reference signal.

When the amplitude of the 30-hertz reference signal and the 30-hertz variable signal are substantially the same, minimum phase distortion and error will occur in the receiver and the output of the receiver will be very accurate.

The 9960-hertz reference carrier signal also varies in amplitude with perturbations and signal strength. These may be smoothed by converting the 30-hertz reference signal and the 9960-hertz reference carrier to DC signals to detect their amplitude differences and use this output as an automatic gain control signal.

In a typical receiver, the automatic gain control derived from the R.F. detector may be used to limit the maximum carrier amplitude to prevent overloading of the R.F. and I.F. amplifiers, but without regard for spurious peak amplitude overloads. The undistorted audio tones then generated at the detector are referenced in amplitude with the F.M. detector output and the difference applied to the automatic gain control is required to prevent peak amplitude overloads at low frequencies including 30 hertz.

FIGURE 1 illustrates an antenna 10 for receiving a VOR signal and supplying it to a VOR receiver 11 which has an R.F. section 12 with a suitable automatic gain control. The R.F. section 12 detects the R.F. carrier signal and supplies it to an I.F. section 13 which also has an automatic gain control.

The output of the I.F. section 13 is supplied to a detector 14 which has an automatic gain control and which detects the 30-hertz reference signal and a 30-hertz variable signal which carry the intelligence from which a line of position may be obtained.

The detector 14 supplies outputs on lead 16 to a first 30-hertz reference detector 17 and to a second 30-hertz reference detector 18. The detector 14 also supplies an output on lead 19 to the 30-hertz variable detector 21 and a second 30-hertz variable detector 20. A diode detector $D_1$ is connected to the output of the 30-hertz reference detector 17 and a diode detector $D_2$ is connected to the output of the 30-hertz variable detector 21. A difference amplifier 22 receives inputs from the diodes $D_1$ and $D_2$ and produces an output which is proportional to the amplitude difference between the 30-hertz reference signal and the 30-hertz variable signal. Smoothing capacitors $C_1$ and $C_2$ are respectively connected between the diodes $D_1$ and $D_2$ and ground.

A capacitor $C_3$ is connected between the output of the difference amplifier 22 and ground. An emitter follower stage 23 is connected to the output of the difference amplifier 22 and supplies inputs on lead 24 to the automatic gain control circuits in the R.F. section 12, the I.F. section 13, and the detector 14.

Since the amplitude of the 30-Hertz reference signal remains constant, it is a good indication of the desired level of the 30-Hertz variable frequency signal. Thus, the detecting of the 30-Hertz reference and the 30-Hertz variable signals and comparing them in the difference amplifier to control the gain in the R.F., I.F. and the detector, assures that these stages are adjusted to the proper gain level.

Thus, the output appearing on leads 16 and 19 will be of the proper amplitude level and when supplied to the detectors 18 and 20 and to a phase detector 26, will produce an accurate output signal. An indicator 27 has a needle 28 which indicates whether the aircraft's position is to the left or right of a selected radial.

The circuitry between the variable 30-Hertz detector 20 and the phase detector 26 is disclosed in my copending application entitled "Remodulation," U.S. Ser. No. 718,412, filed Apr. 3, 1968. In this circuit the variable 30-Hertz signal is passed through a 15-Hertz filter and then full wave rectified to convert the 30-Hertz signal into a 60-Hertz signal. The 60-Hertz signal is filtered out and the result is modulated on the variable 30-Hertz signal which is not passed through the full wave rectifier and 60-Hertz filter. The output of the modulator is a corrected 30-Hertz signal which accurately indicates the variable phase. The 15-Hertz filter is designated by numeral 29 and comprises the capacitors $C_4$, $C_5$ and $C_6$ and resistors $R_2$, $R_3$ and $R_4$. A 30-Hertz phase corrector 31 comprises the resistor $R_5$ and capacitor $C_9$. The modulator 32 receives the output of the phase corrector 31. A full wave rectifier 33 receives the output of the filter 29 and a 60-Hertz filter 34 receives the output of the detector 33. The 60-Hertz filter comprises the resistors $R_6$, $R_8$, $R_9$, $R_{10}$ and $R_{11}$ and capacitors $C_7$, $C_8$ and $C_9$.

The output of the modulator 32 is supplied by leads 36 and 37 to the phase detector 26. The phase detector 26 also receives inputs on leads 38 and 39 from the reference 30-Hertz detector 18.

The improved VOR receiver according to FIGURE 1 detects the amplitude of the variable and reference 30-Hertz signals and adjusts the gain in the R.F., I.F., and detector stages 12, 13 and 14 so that the amplitude of the variable frequency 30-Hertz signal is the same as the amplitude of the 30-Hertz reference signal. This substantially eliminates errors due to distortion and amplitude discrepancies between the two signals and produces an improved output signal which is much more accurate than presently available with existing VOR receivers. The phase of the reference and variable frequency signals is then compared in the phase detector 26 with the variable 30-Hertz signal passing through a remodulation system according to patent application, Ser. No. 718,412, if desired, to produce an output on needle 28 of indicator 27 which is much more accurate than presently possible.

FIGURE 2 illustrates a system wherein the 9960-Hertz reference carrier signal is adjusted by detecting it and comparing it to the detected 30-Hertz reference signal. This eliminates perturbations in the 30-Hertz reference signal and also produces an improved output signal.

In FIGURE 2 like elements are numbered as in FIGURE 1. For example, the antenna 10 supplies an input to the R.F. section 12 which has an automatic gain control circuit and which supplies an output to the I.F. section 13. A 9960-Hertz sub carrier detector 40 is connected to the output of the I.F. section 13 and detects the 9960-Hertz sub carrier and supplies it to a diode $D_7$ which in combination with the capacitor $C_{11}$ converts it to a DC signal. The difference amplifier 22 receives the output of the diode detector $D_7$ and input from the detector $D_1$ which converts the 30-Hertz reference signal to DC and supplies an output on lead 41 to the automatic gain control circuits of the R.F. section 12, the I.F. section 13 and the detector and automatic gain control circuit 14. The output of the detector 14 is supplied to the reference detector 18 and the variable detector 20. The output of the reference 30-Hertz detector is supplied to the phase detector 32 through leads 38 and 39, and the output of the variable 30-Hertz detector 20 is supplied to a remodulation system 42 which is shown in detail in FIGURE 1. The output of the remodulation circuit is supplied on leads 36 and 37 to the phase detector 32.

In operation, the circuit of FIGURE 2 allows the amplitude of the 9960-Hertz sub carrier to be adjusted in accordance with the reference level of the 30-Hertz reference signal from the detector 17. This substantially reduces distortion in the variable 30-Hertz signal and produces an improved VOR output signal.

Although minor modifications might be suggested by those versed in the art, it should be understood that I wish to embody within the scope of the patent warranted hereon all such modifications as reasonably and properly come within the scope of my contribution to the art.

I claim as my invention:

1. An improved VOR receiver with gain control circuits for determining a line of position from a ground transmitter by detecting the phase between a reference and variable phase signal comprising,
    means for detecting the amplitude of the reference frequency signal,
    means for detecting the amplitude of the variable phase signal,
    comparing means receiving the outputs of said amplitude detecting means and producing an output proportional to their differences, and
    said comparing means connected to said gain control circuits.

2. An improved VOR receiver according to claim 1 wherein said receiver includes a radio frequency stage with an automatic gain control circuit and the output of said comparing means is connected to said R.F. automatic gain control circuit.

3. An improved VOR receiver according to claim 1 wherein said receiver includes an intermediate frequency stage with an automatic gain control circuit and the output of said comparing means is connected to said I.F. automatic gain control circuit.

4. An improved VOR receiver according to claim 1 wherein said receiver includes a detector with an automatic gain control circuit and the output of said comparing means is connected to the detector automatic gain control circuit.

5. An improved VOR receiver according to claim 1 wherein said means for detecting the amplitude of said reference phase signal comprises a first rectifier which receives the reference phase signal, said means for detecting the amplitude of said variable phase signal comprises a second rectifier which receives the variable phase signal, and said comparing means comprises a difference amplifier which receives the outputs of the first and second rectifiers.

6. An improved VOR receiver according to claim 5 comprising first filtering means connected across the output of the first rectifier and second filtering means connected across the output of the second rectifier.

7. An improved VOR receiver according to claim 6 wherein said first and second filtering means comprise capacitors.

8. An improved VOR receiver according to claim 1 wherein said reference and variable phase signals have a frequency of thirty hertz.

9. An improved VOR receiver according to claim 1 comprising means for detecting the reference phase signal, means for detecting the variable phase signal, and phase detecting means receiving the outputs of said detecting means and producing an output indicative of the line of position of said receiver relative to said transmitter.

10. An improved VOR signal with gain control circuits for determining a line of position from a ground transmitter by detecting the phase between a reference phase signal and a variable phase signal with the reference phase signal being modulated on a sub carrier which amplitude modulates the radio frequency carrier of the transmitter comprising, means for detecting the amplitude of the reference phase signal,
means for detecting the amplitude of the sub carrier,
comparing means receiving the outputs of said amplitude detecting means and producing an output proportional to their differences, and
said comparing means connected to said gain control circuits.

11. An improved VOR receiver according to claim 10 wherein said receiver includes a radio frequency stage with automatic gain control circuit and the output of said comparing means is connected to the R.F. stage automatic gain control circuit.

12. An improved VOR receiver according to claim 10 wherein said receiver includes an intermediate frequency stage with automatic gain control circuit and the output of said comparing means is connected to the I.F. stage automatic gain control circuit.

13. An improved VOR receiver according to claim 10 comprising means for detecting the reference phase signal, means for detecting the variable phase signal, and phase detecting means connected to said detecting means to produce an output indicative of position of said receiver relative to the transmitter.

14. The method of obtaining an improved line of position from a VOR receiver having reference and variable phase signals comprising, detecting the amplitude of the reference phase signal,
detecting the amplitude of the variable phase signal,
comparing the amplitudes of said signals, and
adjusting the gain of said receiver so that the amplitude of the variable phase signal is substantially equal to the amplitude of the reference phase signal.

References Cited

UNITED STATES PATENTS

| 2,513,477 | 7/1950 | Gubin | 324—83 |
| 2,517,805 | 8/1950 | Spindler | 324—83 |
| 3,142,062 | 7/1964 | Held | 343—106 |
| 3,358,231 | 12/1967 | Baganoff | 324—83 |

RICHARD A. FARLEY, Primary Examiner

HERBERT C. WAMSLEY, Assistant Examiner

U.S. Cl. X.R.

325—404